Patented Oct. 4, 1932

1,880,544

UNITED STATES PATENT OFFICE

WILLIAM H. WAGGAMAN, OF ALEXANDRIA, VIRGINIA, ASSIGNOR, BY MESNE ASSIGNMENTS, TO THE OBERPHOS COMPANY, OF BALTIMORE, MARYLAND, A CORPORATION OF MARYLAND

PREPARATION OF FERTILIZER

No Drawing.  Application filed March 30, 1928. Serial No. 266,119.

This invention relates to a process of preparing fertilizer materials and pertains more specifically to a method of producing fertilizer containing available phosphoric acid.

According to the usual method of preparing super and double super phosphates it is the practice to deposit in a mixing pan a predetermined quantity of ground phosphate rock and add to this a measured amount of sulphuric or phosphoric acid. The rock and reagent are then agitated by means of a suitable mechanism so as to mix the two. Due to the affinity of the reagent for the rock the reactions proceed so vigorously that within a period of from three to five minutes the mass "sets up", that is to say solid reaction products are formed and the mass is transformed from a slurry to a substantially solid phase.

Such a method presents certain decided disadvantages. In order to obtain the optimum acidulation it is necessary that the liquid reagent be thoroughly incorporated with the rock. This condition could not be secured with the described method by reason of the fact that the rock tended to form agglomerations or nodules, the cores of which were unattacked by the acid. Since the agitation period was of short duration these nodules in many cases were not disintegrated and hence appeared in the final product as insoluble phosphate.

It is an object of this invention to provide a process for manufacturing phosphate fertilizer which insures an improved mixture of phosphatic material and reagent.

Another object is to accelerate the preparation of phosphatic fertilizer by utilizing, to a maximum degree, the autogenous heats.

A further object is to devise a process for mixing phosphatic material and a reagent which insures a maximum reactive surface.

Yet another object is to provide a process of manufacturing phosphatic fertilizer which insures reaction of all of the phosphate ingredients.

With these and other equally important objects in view the invention comprehends the concept of subjecting the raw material to a preliminary treatment whereby its inclusion in an acid body is facilitated and substantially the entire surface of the raw material is subjected to the action of the acidifying agent.

As hereinbefore indicated, the usual method of preparing fertilizers of the character referred to comprises the steps of adding to dry rock a quantity of acid which previously had been diluted to a predetermined concentration, which in the case of sulphuric acid is usually about 52° Bé. As a result, as has been indicated, a thorough mixing of the two could not be obtained. In addition to this no utilization was made of the heat of dilution of the acid. In the present method I not only am able to obtain an improved incorporation of the rock and acid but I also utilize the heat of dilution of the acid as well as the exothermic heat of reaction.

In carrying out the process phosphatic material, such as phosphate rock, is ground to any desired degree of fineness. To the rock dust there is then added a predetermined quantity of water. The quantity of water which is added is calculated as that which will reduce the initial concentration of the acid down to that strength which is desired for the conversion. As an example, in manufacturing super phosphates the acid employed may have an initial concentration of about 66° Bé. If it is desired to carry out the actual acidulation with a 52° Bé. acid, such a quantity of water is added to the rock as will lower the concentration from 66° Bé. to 52° Bé. The actual quantity of water added in each case will of course depend on the initial acid strength, the desired acidifying concentration and the volume of acid.

It has been found, as explained in copending application Serial No. 227,356, filed October 18, 1927, that optimum results are obtained with a certain definite acid concentration. As disclosed therein an acid strength of substantially 41° Bé. has a critical value in the manufacture of phosphate fertilizers. This factor is utilized in the present process, although as indicated above, the reduction in concentration may be carried out to any desired point. In the preferred mode of operation therefore, a sufficient quantity of water is added to the rock to insure a final acid strength of approximately 41° Bé. Such a reduction, it will be understood, not only insures the attainment of the beneficial results, as fully disclosed in that application, but it also produces a greater quantity of heat and a free flowing slurry of rock and acid.

The quantity of water, calculated according to the indicated method, may be added to the ground rock and the mass thoroughly stirred so as to insure a complete dispersion of the discrete rock through the aqueous vehicle. Since the water is non-reactive agitation or mixing may be prolonged for any desired period of time. In this manner, therefore, the separate rock particles, as a discontinuous phase, may be thoroughly dispersed in a continuous aqueous phase. This mixing of the rock and water may be continued until each of the rock particles is covered with a film of liquid. The invention comprehends any method of mixing rock and water to obtain the desired dispersion.

The mixing may be effected in a container in which the conversion of insoluble to soluble phosphate is to be carried out or it may be accomplished by employing a separate mixing device and then depositing the slurry in a reaction container.

After the rock slurry has been made up by any desired method there is then added to it, with constant agitation, a predetermined volume of concentrated acid, such for example as sulphuric acid. It will be understood that the acid may be flowed in through a suitable line, either under gravity head or applied pressure or, if desired, it may be sprayed over the surface or into the body of the slurry. It will be appreciated that since the rock particles are covered with a film of water the acid will quickly permeate through the mass, due to the facile miscibility of these two liquids. As the acid is brought in contact with the water the heat of dilution is thus generated in situ and throughout the whole body of the mass. This heat is therefore utilized to the fullest degree and over the extended reaction surface in accelerating the ensuing reactions. The heat of dilution increases or accentuates the accelerating influence of the exothermic heat of reaction between the acid and phosphatic material. As will be understood, the speed of reaction will depend, to a considerable degree, upon the effective concentration of the acid which, as has been explained, may be reduced to any desired degree.

After incorporation of the rock in the acid the conversion of the insoluble phosphate to the soluble forms proceeds in the well known manner. In the present method, due to the thorough mixing, assurance of contact with acid of the entire body of rock and the accelerating effect of generated heats, the conversion is very rapid and complete. By this process, due to the conditions established, the reaction proceeds practically, quantitatively, and hence substantially the theoretical quantity of acid requisite for reaction with the phosphate and impurities may be employed. It will be seen therefore that I am able to avoid the usual practice of excessive dousing and hence procure a product which contains less free acid. The elimination of free acid and the assurance of complete reaction of all of the rock are decided advantages inasmuch as the ultimate yield of available phosphate is increased and the time and labor required for drying and curing the material reduced.

After the conversion of the phosphatic material the product may be ground and subjected to any desired supplementary steps such as mechanical drying, aeration and dusting.

Another method of carrying out the process may comprise the addition of a slurry of rock dust and water to a body of acid. During the addition of the slurry the acid within the container is preferably agitated.

The slurry may be run into the acid by an ordinary pipe line or may be sprayed in it by using a suitably positioned nozzle.

If desired a further modification of the process may be used. After mixing the phosphate rock with the water, the mixture may be allowed to stand for a short period of time. During this period of quiescence the larger rock particles will tend to settle or gravitate toward the bottom so that when the slurry is subsequently admitted to the acid body, the coarser or larger particles enter the strong acid first, in other words, when such acid is at its greatest strength and possessing its highest acidulating properties. As the acid becomes weaker, due both to dilution and partial neutralization, the finer or more rapidly decomposible particles of the rock are introduced. This selective action of the stronger acid on the larger rock particles, it will be appreciated, tends to shorten the reaction period and insure a complete decomposition.

I claim:

1. A process of producing available phosphates comprising introducing a stream of an aqueous slurry of phosphatic material into a body of a liquid acidifying agent in such a manner that the larger particles in the slurry are first contacted with the acid.

2. A process of mixing phosphatic material comprising grinding the raw material, wetting the surfaces of the ground particles with water and adding the wetted particles to a body of strong acid in such a manner that the larger particles of the raw material are first contacted with the acid.

In testimony whereof I affix my signature.

WILLIAM H. WAGGAMAN.